US011982239B2

(12) United States Patent
Unton et al.

(10) Patent No.: US 11,982,239 B2
(45) Date of Patent: May 14, 2024

(54) GAS TURBINE ENGINE SYSTEM WITH MIXED FLOW AUXILIARY POWER UNIT

(71) Applicant: Rolls-Royce North American Technologies Inc., Indianapolis, IN (US)

(72) Inventors: Timothy Unton, Avon, IN (US); Kirk C. Lefort, Avon, IN (US); Paul K. Johnson, Ft. Wayne, IN (US); Andrew J. Eifert, Indianapolis, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 27 days.

(21) Appl. No.: 17/554,853

(22) Filed: Dec. 17, 2021

(65) Prior Publication Data

US 2023/0193833 A1 Jun. 22, 2023

(51) Int. Cl.
| | | |
|---|---|---|
| *F02C 9/00* | (2006.01) | |
| *F02C 6/08* | (2006.01) | |
| *F02C 7/18* | (2006.01) | |
| *F02C 9/18* | (2006.01) | |

(52) U.S. Cl.
CPC .............. *F02C 9/18* (2013.01); *F02C 6/08* (2013.01); *F02C 7/185* (2013.01); *F05D 2220/50* (2013.01); *F05D 2260/213* (2013.01); *F05D 2260/232* (2013.01); *F05D 2260/601* (2013.01); *F05D 2260/606* (2013.01); *F05D 2270/3011* (2013.01); *F05D 2270/3015* (2013.01)

(58) Field of Classification Search
None
See application file for complete search history.

(56) References Cited

U.S. PATENT DOCUMENTS

| | | | | |
|---|---|---|---|---|
| 4,373,335 | A | * | 2/1983 | Kuribayashi ........... F02B 37/18 60/602 |
| 5,505,587 | A | * | 4/1996 | Ghetzler .............. B64D 41/007 415/49 |
| 7,707,838 | B2 | | 5/2010 | Sheldon et al. |
| 8,480,460 | B2 | | 7/2013 | Schwarz |
| 9,302,775 | B2 | | 4/2016 | Houssaye |
| 10,450,074 | B2 | * | 10/2019 | Stieger .................... F01D 15/10 |
| 10,625,874 | B2 | | 4/2020 | Rideau et al. |
| 10,988,262 | B2 | | 4/2021 | Horner et al. |
| 2005/0210863 | A1 | * | 9/2005 | Wollenweber ............ F02C 6/08 60/226.1 |
| 2011/0000208 | A1 | * | 1/2011 | Robinson ................ F02B 37/16 60/602 |

(Continued)

FOREIGN PATENT DOCUMENTS

WO    WO-2014055106 A1 * 4/2014 ................ F02C 3/04

OTHER PUBLICATIONS

Wikipedia, General Electric T700, 2017 (Year: 2017).*

*Primary Examiner* — Edwin Kang
(74) *Attorney, Agent, or Firm* — Barnes & Thornburg LLP (57) ABSTRACT

A bleed air control system is configured to vary the air pressure at the inlet of a gas turbine engine. The bleed air control system includes a first gas turbine engine configured to provide bleed air, a second gas turbine engine acting as an auxiliary power unit, and a bleed air control system configured to selectively provide bleed air from the first gas turbine engine to the second gas turbine engine.

9 Claims, 6 Drawing Sheets

(56) References Cited

U.S. PATENT DOCUMENTS

| | | | |
|---|---|---|---|
| 2012/0248242 A1* | 10/2012 | Gagne | F02C 6/08 |
| | | | 244/58 |
| 2015/0034771 A1 | 2/2015 | Joubert et al. | |
| 2015/0275758 A1* | 10/2015 | Foutch | F02C 7/047 |
| | | | 60/785 |
| 2015/0345403 A1* | 12/2015 | Cai | F02C 9/00 |
| | | | 701/100 |
| 2015/0354464 A1* | 12/2015 | Hillel | F04D 27/0261 |
| | | | 415/144 |
| 2017/0036768 A1 | 2/2017 | Stieger et al. | |
| 2018/0057172 A1* | 3/2018 | Sautron | F02C 3/04 |
| 2019/0367171 A1 | 12/2019 | Zug | |
| 2019/0367173 A1 | 12/2019 | Zug | |
| 2019/0368417 A1* | 12/2019 | Terwilliger | F02C 9/18 |
| 2019/0390925 A1* | 12/2019 | Sangli | B01F 25/31243 |
| 2021/0122478 A1* | 4/2021 | Mackin | B64D 13/06 |

* cited by examiner

GAS TURBINE ENGINE SYSTEM WITH MIXED FLOW AUXILIARY POWER UNIT

FIELD OF THE DISCLOSURE

The present disclosure relates generally to auxiliary power units installed in aircraft, and more specifically to the management of compressed air offtake to such auxiliary power units.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Auxiliary power units are typically small gas turbines used for main engine starting, providing electrical power for the aircraft, and providing compressed air for use in environmental control systems. Modern aircraft are becoming increasingly more electric, with electric driven compressors, electric in-flight entertainment and electro-mechanical actuators instead of hydraulic actuators. These loads may exceed the power generation capability of generators mounted to the primary propulsion engines of the aircraft, and may be supplemented by additional power generation from the auxiliary power units.

SUMMARY

The present disclosure may comprise one or more of the following features and combinations thereof.

According to an illustrative aspect of the disclosure, a gas turbine engine system includes a first engine, a second engine, and a bleed air control system. The first engine includes a first compressor, a first combustor, and a first turbine. The second engine includes a second engine core and an air flow mixer. The second engine core including a second compressor, a second combustor, and a second turbine. The air flow mixer configured to receive a flow of ambient air and combine the flow of ambient air with compressed air to form a combined air flow, and further configured to direct the combined air flow into the second engine core. The bleed air control system is configured to control an inlet pressure of the second compressor.

In some embodiments, the bleed air control system includes a conduit, a flow control valve, and a controller. The conduit is configured to direct the compressed air from the first compressor to the air flow mixer. The flow control valve is fluidly connected with the conduit. The flow control valve is configured to selectively vary the flow of compressed air through the conduit. The controller is programmed to adjust the flow control valve in response to an inlet pressure of the second compressor being less than a predetermined value so that a pressure of the combined flow that is directed into the second engine core allows the second engine core to be operable in a low ambient pressure environment.

In some embodiments, the air flow mixer is a gas jet ejector. The gas jet ejector is configured to use the compressed air from the first compressor as a motive fluid to create a vacuum and pull ambient air into the gas jet ejector and create the combined flow directed into the second engine core.

In some embodiments, the gas jet ejector includes a nozzle and an ambient air inlet arranged circumferentially around the nozzle. The nozzle receives the flow of compressed air and the ambient air inlet receives the ambient air.

In some embodiments, the air flow mixer is an inlet for ambient air and a check valve in fluid connection with the conduit. The check valve is configured to direct the compressed air flow into the ambient air inlet.

In some embodiments, the second engine includes a back pressure regulator downstream of the second engine core. The back pressure regulator is configured to vary a pressure of an exhaust air of the second engine.

In some embodiments, the bleed control system further includes a heat exchanger fluidly connected with the conduit. The heat exchanger is configured to remove heat from the compressed air.

In some embodiments, the heat exchanger is configured to receive ambient air for removing the heat from the compressed air. In some embodiments, the first engine further includes a fan. The heat exchanger is configured to receive air from the fan for removing heat from the compressed air.

In some embodiments, the controller is programed to vary the flow control valve and the back pressure regulator based on a difference between the pressure at an inlet of the second compressor and a reference pressure value on a predetermined pressure schedule of the second gas turbine engine.

In some embodiments, the first compressor further comprises an intermediate-pressure compressor section and a high-pressure compressor section. The intermediate-pressure compressor section having a first port fluidly connected to the conduit. The high-pressure compressor section having a second port fluidly connected to the conduit. The controller is programmed to selectively open one of the first port and the second port based on a predetermined pressure versus flow ratio of the first compressor stored on the controller.

According to another illustrative aspect of the disclosure, a gas turbine engine system includes a first engine, a second engine, and a bleed air control system. The first engine includes a first compressor, a first combustor, and a first turbine. The second engine includes a second engine core and an air flow mixer. The second engine core including a second compressor, a second combustor, and a second turbine. The air flow mixer positioned at the inlet of the second engine core.

The bleed air control system includes a conduit, a flow control valve, and a controller. The conduit connects the first compressor to the air flow mixer. The flow control valve fluidly connects with the conduit. The controller is programmed to adjust the flow control valve in response to an inlet pressure of the second compressor being less than a predetermined value.

In some embodiments, the air flow mixer is a gas jet ejector. In some embodiments, the gas jet ejector further includes an ambient air inlet. The compressed air from the first compressor and ambient air enter the ejector coaxially and the compressed air passing through a nozzle positioned radially inward of the ambient air inlet.

In some embodiments, the air flow mixer is an inlet for ambient air and a check valve in fluid connection with the conduit. In some embodiments, the second engine includes a back pressure regulator downstream of the second engine core.

In some embodiments, the bleed control system further includes a heat exchanger fluidly connected with the conduit. In some embodiments, the heat exchanger receives ambient air.

In some embodiments, the first engine further includes a fan. The heat exchanger receives air from the fan.

In some embodiments, the first compressor further comprises an intermediate-pressure compressor section, a port of the intermediate-pressure compressor fluidly connected to the conduit, a high-pressure compressor section, and a port of the high-high pressure compressor fluidly connected to the conduit. The controller is programmed to selectively open the port of the intermediate-pressure compressor and the port of the high-pressure compressor based on a predetermined pressure vs flow ratio of the first compressor.

According to an illustrative method of the disclosure, a method of controlling a gas turbine engine system includes compressing a first air stream using a first compressor of a first gas turbine engine to provide a first compressed air stream, compressing a second air stream using a second compressor of a second gas turbine engine, and determining an inlet pressure of an inlet of a second compressor, directing a portion of the first compressed air stream to the inlet of the second compressor in response to the inlet pressure of the second compressor being lower than a predetermined value.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
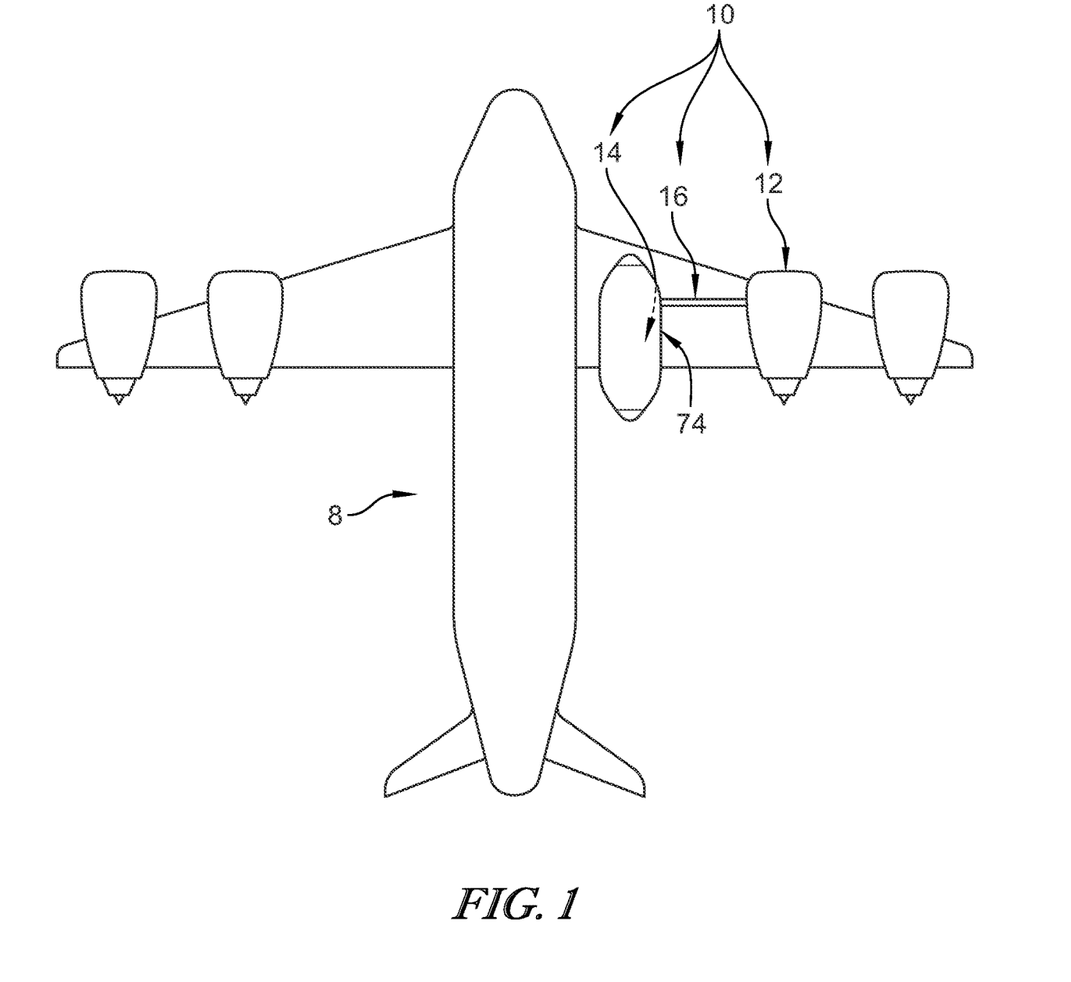
FIG. 1 is a diagrammatic view of an aircraft having four propulsive gas turbine engines and an auxiliary power unit provided by a fifth gas turbine engine enclosed in a pod, one of the four propulsive gas turbine engines is connected to the gas turbine engine located in the pod as part of a gas turbine engine system shown in FIG. 2 for providing auxiliary power.
Figure 2:
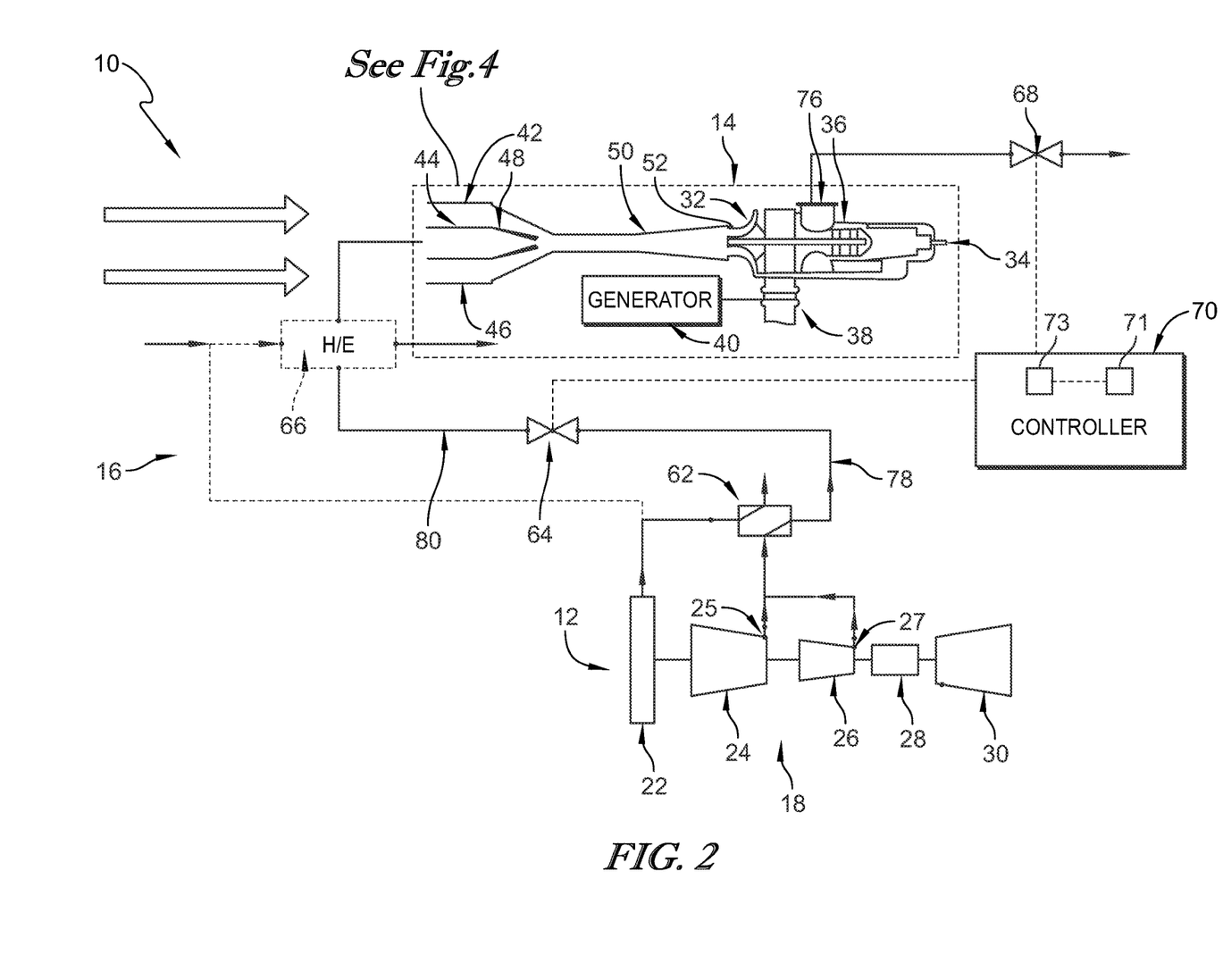
FIG. 2 is a diagrammatic view of a gas turbine engine system in accordance with the present disclosure; the gas turbine engine system including a first gas turbine engine that produces power for an aircraft, a second gas turbine engine that provides auxiliary power to the first engine and the aircraft, a bleed air control system configured to selectively provide compressed bleed air from the first engine to an air flow mixer of the second engine to help the second engine operate at higher altitudes and an exhaust back pressure regulator to maintain adequate exhaust backpressure for the second engine at higher altitudes.

A gas turbine engine system 10 for producing propulsion and power for an aircraft 8 is shown diagrammatically in FIGS. 1 and 2. The system 10 includes a first gas turbine engine 12, a second gas turbine engine 14, and a bleed air control system 16. The first gas turbine engine 12 produces propulsion for the aircraft 8. The second gas turbine engine 14 is an auxiliary power unit and provides auxiliary power to the first gas turbine engine 12 and the aircraft 8. The bleed air control system 16 controls the delivery of a supply of compressed bleed air 78 from the first gas turbine engine 12 to the second gas turbine engine 14 and the aircraft 8.

In the illustrative embodiment, the aircraft 8 includes a number of gas turbine engines for propelling the aircraft 8; however, only the first gas turbine engine 12 is configured for delivering the compressed bleed air 78 to the second gas turbine engine 14. In other embodiments, any number of the propulsive gas turbine engines of the aircraft 8 or other unpictured APUs may be connected with and configured to deliver compressed bleed air 78 to the auxiliary power unit/second gas turbine engine 14.

In this embodiment shown in FIG. 2, the first gas turbine engine 12 includes a fan 22, a compressor 18, a combustor 28, and a turbine 30. The compressor 18 includes an intermediate-pressure compressor 24 and a high-pressure compressor 26 in the illustrative embodiment. In some embodiments, the turbine 30 may include a high-pressure section, an intermediate-pressure section, and a low-pressure section to drive the high-pressure compressor 26, the intermediate pressure compressor 24, and the fan 22 respectively. Air passes through the fan 22 which is driven by the turbine 30. A portion of the air is bypassed around the compressor 18 to provide thrust for the aircraft 8. Another portion of the air is compressed by the compressor 18 and mixed with fuel in the combustor 28. The fuel-air mixture in the combustor 28 is ignited, adding energy to the air, and some portion of that energy is extracted by the turbine 30.

The second gas turbine engine 14 includes a compressor 32, a combustor 34, a turbine 36, a gearbox 38, an electric generator 40, and an air flow mixer 42 as shown in FIG. 2. In some embodiments the turbine 36 may include a high-pressure section to drive the compressor 32 and a low-pressure section to drive the gearbox 38. Air is directed through the air flow mixer 42 and is compressed as it enters the compressor 32 after passing through the air flow mixer 42. Fuel is added to the air in the combustor 34 and ignited to add energy to the air. Energy is extracted from the combusted air by the turbine 36, which powers the gearbox 38 and the compressor 32. The electric generator 40 is powered by the gearbox 38 and is configured to produce electricity for auxiliary use in the aircraft 8, first gas turbine engine 12, and or second gas turbine engine 14 for example.

The air flow mixer 42 is fluidly connected with the first gas turbine engine 12 via the bleed air control system 16 as shown in FIG. 2. At relatively low altitudes, the air flow mixer 42 does not receive the compressed bleed air 78 from the first gas turbine engine and conducts ambient air into the compressor 32 of the second gas turbine engine 14. The second gas turbine engine 14 is configured to be capable of operating independent of the first gas turbine engine 12 when the inlet air is at a high enough pressure. At relatively high altitudes, the low ambient pressure environment may be such that the compressor 32 operates below a desired performance level and/or below a desired efficiently level. At these relatively high altitudes, the air flow mixer 42 receives ambient air and compressed bleed air 78 from the first gas turbine engine 12. The air flow mixer 42 mixes the ambient air and compressed air to provide air flow to the compressor 32 having a higher pressure than ambient air alone to improve performance of the compressor 32 at the high altitudes. The altitude at which compressed bleed air 78 is used to supplement the ambient air may vary depending on the altitude at which the second gas turbine engine 14 is certified to operate and a magnitude of the electrical loads the second gas turbine engine 14 is desired to support. In some embodiments, the air flow mixer 42 may be used to mix the bleed air 78 with ambient air above 20,000 feet altitude.

The bleed air control system 16 is configured to selectively vary the flow of compressed bleed air 78 from the compressor 18 of the first engine 12 to the air flow mixer 42 and compressor 32 of the second engine 14. The bleed air control system 16 includes an optional pre-cooler 62, a flow control valve 64, an optional heat exchanger 66, a back pressure regulator 68, a controller 70, and conduit 80. The compressed bleed air 78 is bled through conduit 80 from the compressor 18 of the first engine 12 and passes through the pre-cooler 62 if one is present. The pre-cooler 62 uses ambient air or other heat sink to remove heat from the bleed air 78 before it enters the flow control valve 64. The pre-cooler 62 may already be present for the first gas turbine engine 12 and easily incorporated into the bleed control system 16. The compressed bleed air 78 may be bled through one or both of a first port 25 on the intermediate-pressure compressor 24 and a second port 27 on the high-pressure compressor 26 into the conduit 80.

The flow control valve 64 is configured to open and close selectively to allow the compressed bleed air 78 to move through the conduit 80 from the compressor 18 to the air flow mixer 42 or block the compressed bleed air 78 as suggested in FIG. 2. The flow control valve 64 can be partially opened to allow for discretely or infinitely variable flow control of the compressed bleed air 78. The flow control valve 64 is illustratively located downstream of the pre-cooler 62. In other embodiments, the flow control valve 64 is located upstream of any pre-cooler 62.

The heat exchanger 66, if present, uses ambient air or another heat sink such as fan air to remove heat from the compressed bleed air 78 moving through the bleed air control system 16 as suggested in FIG. 2. The heat exchanger 66 may include valving to vary the flow of ambient air through the heat exchanger 66. The heat exchanger 66 is illustratively downstream of the flow control valve 64. In other embodiments, the heat exchanger 66 is located upstream of the flow control valve 64.

The back pressure regulator valve 68 is located downstream of the second gas turbine engine 14 as shown in FIG. 2. The back pressure regulator 68 is configured to open and close selectively when commanded by the controller 70 to maintain a desired pressure at the exit of the second gas turbine engine 14. Air that exits the back pressure regular valve 68 is discharged to ambient air. Controlling the back pressure with the back pressure regulator valve 68 allows the controller 70 to maintain a desired pressure change across the engine when the inlet pressure is varied in order to keep the second gas turbine engine 14 on a pre-determined pressure schedule.

Figure 3:
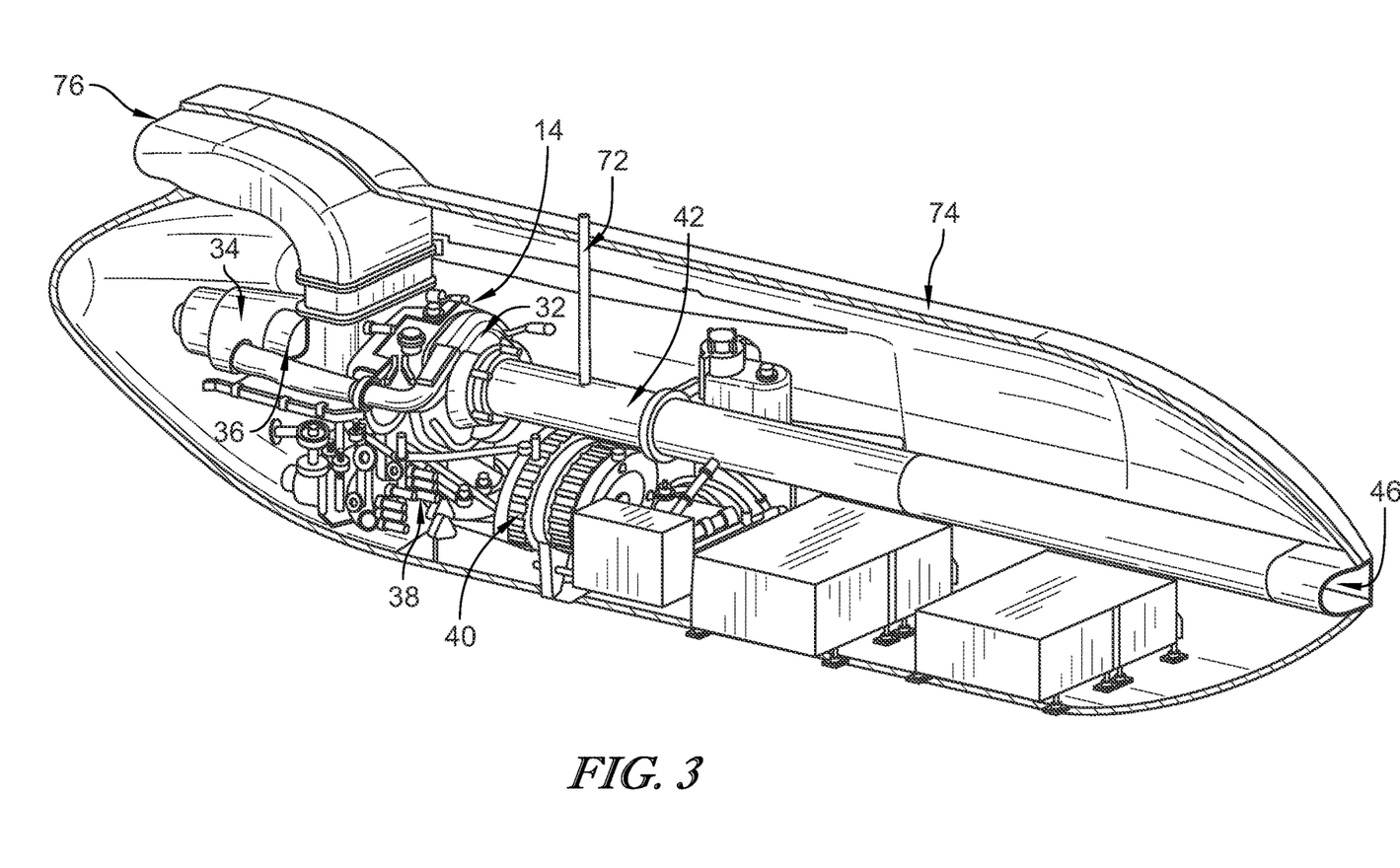
FIG. 3 is a perspective view of the second gas turbine engine included in the system of FIG. 2 showing that a container coupled with the aircraft is cutaway to reveal the second gas turbine engine therein along with other auxiliary components such as batteries, a generator, etc.

In some embodiments, the second engine 14 is located within a pod 74 as shown in FIG. 3. The pod 74 is coupled with the aircraft 8. Illustratively, the pod 74 includes an ambient air inlet 46 and a compressed air inlet 72. The ambient air inlet 46 is connected with the air flow mixer 42 and is configured to receive ambient air from outside of the pod 74 and direct the ambient air to the air flow mixer 42. The air inlet 72 fluidly connects the air flow mixer 42 with conduit 80 that delivers the compressed bleed air 78 from the compressor 18 to the air flow mixer 42. An exhaust duct 76 is fluidly coupled with the turbine 36 of the second gas turbine engine 14 and is configured to direct the combusted gases out of the second gas turbine engine 14 and out of the pod 74. As shown in FIG. 3, the electric generator 40 is located within the pod 74 and other components may be located in the pod 74 such as batteries, electric circuitry, cooling fluids, etc.

Figure 4:
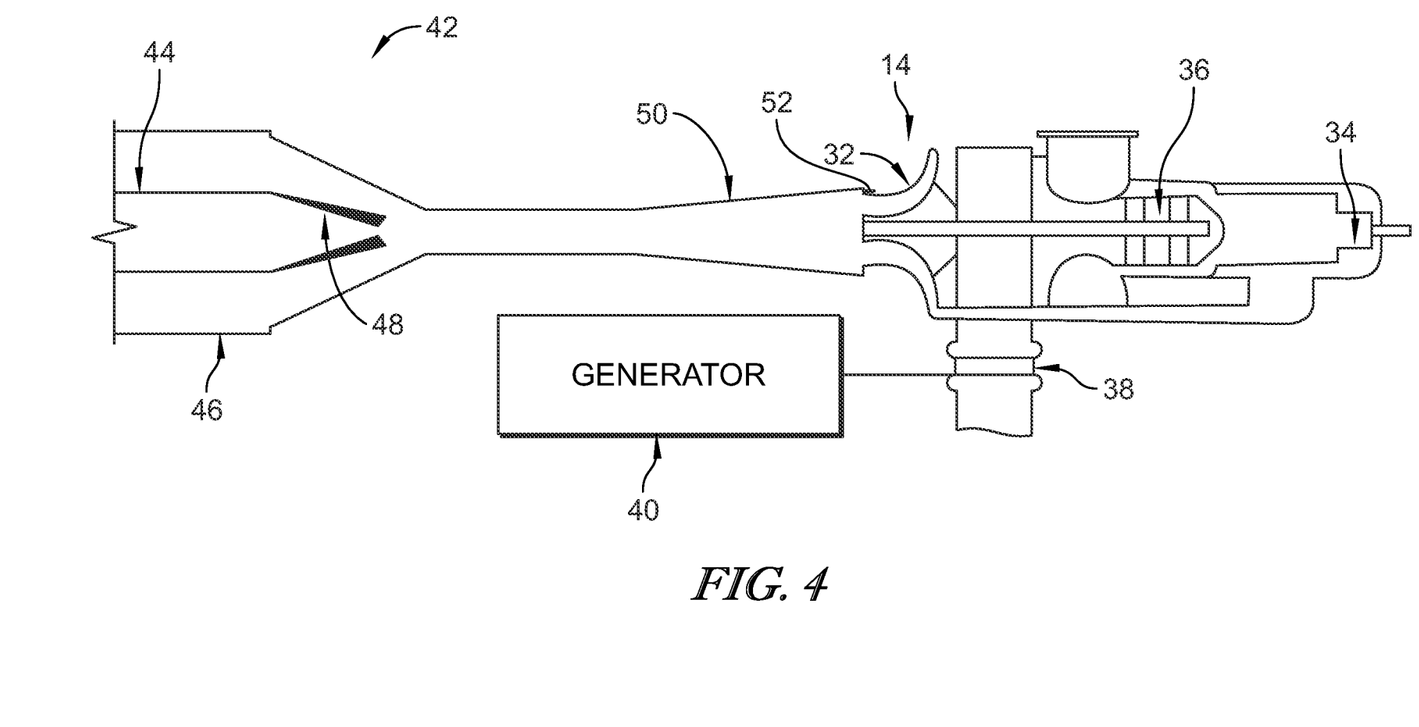
FIG. 4 is a diagrammatic view of an air flow mixer coupled to the second gas turbine engine inlet, wherein the airflow mixer is an ejector including an ambient air inlet and a compressor bleed air inlet.

A detailed view of the gas turbine engine 14 is shown in FIG. 4. As shown, the air flow mixer 42 is an ejector and includes a compressed air inlet 44, an ambient air inlet 46, a convergent-divergent nozzle 48, a diffuser 50, and a pressure sensor 52. The compressed air inlet 44 is fluidly connected to the conduit 80 on one side and the convergent-divergent nozzle 48 on the other. The ambient air inlet is arranged circumferentially around the compressed air inlet 44. The ambient air inlet 46 and the convergent-divergent nozzle 48 are both fluidly connected to the diffuser 50. The pressure sensor 52 is located where the diffuser 50 is fluidly connected to the compressor 32.

The compressed bleed air 78, when delivered to the air flow mixer 42, enters the compressed air inlet 44 and passes through the nozzle 48, which converts some of the pressure in the compressed bleed air 78 to velocity. The air that exits the nozzle 48 acts as a motive fluid and creates a vacuum which pulls or entrains the lower pressure ambient air coming through the ambient air inlet 46 to form a combined flow. This combined flow has a higher pressure than just the ambient air alone and passes through the diffuser 50, which increases the pressure of the air entering the compressor 32 of the second gas turbine engine 14. The pressure sensor 52 measures the pressure of the air at the exit of the diffuser 50 and the inlet of the compressor 32. The pressure at compressor 32 may allow the second gas turbine engine 14 to operate at higher altitudes than it would be capable of operating at using ambient air alone in a low ambient pressure environment.

Figure 5:
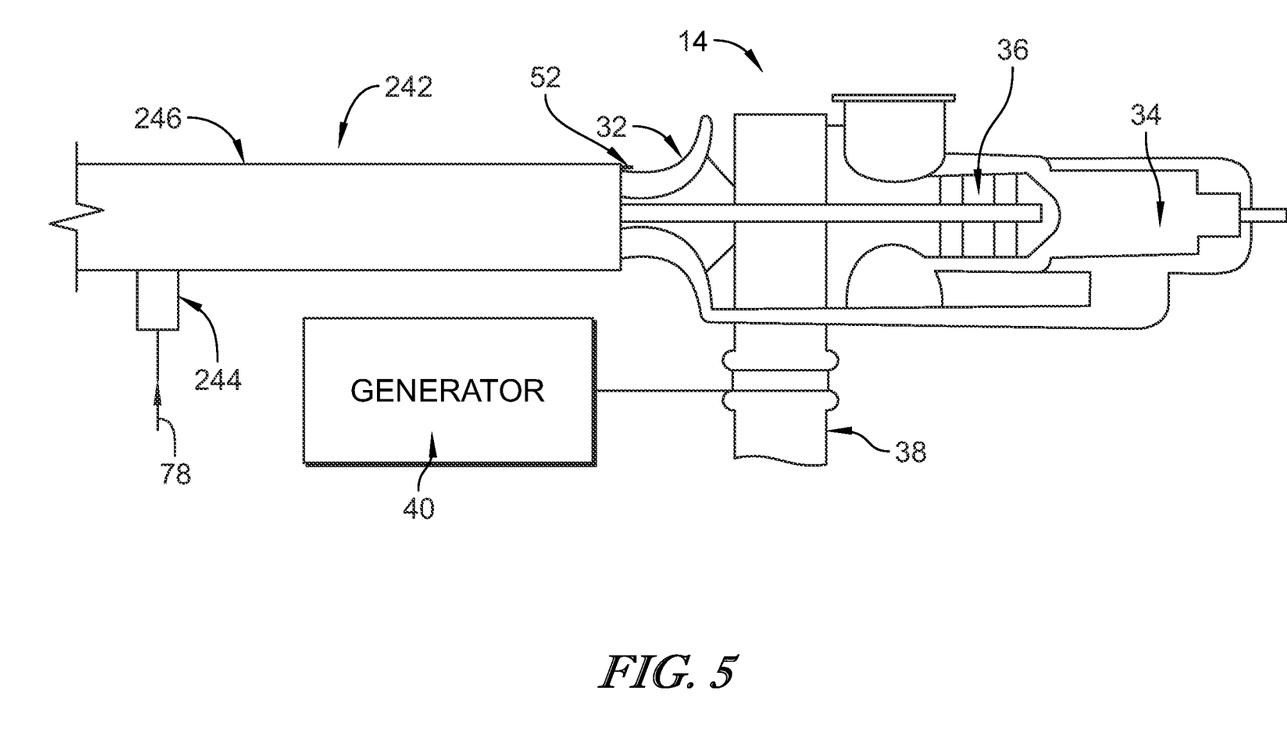
FIG. 5 is a diagrammatic view of an air flow mixer coupled to the second gas turbine engine inlet, wherein the airflow mixer is a rapid open/close valve including an ambient air inlet and a compressor bleed air valve.

Another embodiment of an air flow mixer 242 is shown in FIG. 5. The air flow mixer 242 is substantially similar to the air flow mixer 42 except where the following description deviates from the air flow mixer 42. The air flow mixer 242 includes a check valve 244 and an ambient air inlet 246. The check valve 244 is fluidly connected to the compressor 18 to receive the compressed bleed air 78. The check valve 244 opens and closes as needed to add compressed bleed air 78 to the ambient air in the air flow mixer 242 in order to maintain a desired pressure at the pressure sensor 52 for the compressor 32 of a second gas turbine engine 14. Illustratively, the ambient air inlet 246 has a generally constant diameter and does not converge or diverge.

The controller 70 varies the amount of compressed bleed air 78 delivered to the air flow mixer 42 as suggested in FIG. 2. The controller 70 includes a memory 71 having instructions and data stored therein and a processor 73 configured to perform the instructions and access the data stored on the memory 71. The controller 70 is connected with the flow control valve 64 and the back pressure regulator valve 68. The controller 70 reads the pressure from pressure sensor 52 and compares that pressure to a reference pressure in a lookup table stored in the memory 71. The controller 70 is configured to adjust the flow control valve 64 based on the values in the reference pressure in a lookup table to vary the amount of compressed bleed air 78 delivered from the compressor 18 to the air flow mixer 42 in order to raise the pressure measured from pressure sensor 52.

The controller 70 is further configured to adjust the back pressure regulator valve 68 according to a pressure schedule stored in the memory 71 to vary the exhaust air pressure at the exhaust duct 76 to maintain a desired pressure ratio across the second gas turbine engine 14. This may be helpful because the low ambient pressure environment may cause the exhaust air pressure to be lower than expected at the exhaust duct 76 due to the bleed air control system 16 raising the pressure at the inlet of the compressor 32.

In configurations such as the one shown in FIG. 2 where the compressor 18 includes an intermediate-pressure compressor 24 and a high-pressure compressor 26, the controller 70 will selectively open a port on one or both of the intermediate-pressure compressor 24 and the high-pressure compressor 26 based on a compressor map with a pressure versus flow ratio stored in the memory 71. This selective mix of intermediate-pressure and high-pressure bleed air can allow the controller 70 to control the surge margin of the first gas turbine engine 12. The mix of intermediate-pressure and high-pressure bleed air can also be used to control the pressure of air mixed with the ambient air and delivered to the second gas turbine engine 14. In alternative embodiments the engine control system of the first gas turbine engine 12 or a entirely mechanical system may control the ports of the intermediate-pressure compressor 24 and the high-pressure compressor 26.

Maintaining these desired pressures allows the second gas turbine engine 12 to run at more optimal conditions and to accommodate the load on the electric generator 40 when aircraft 8 is at high altitudes and the second gas turbine engine 12 is functioning as an electronic auxiliary power unit (e-APU). An e-APU functions similarly to a standard aircraft auxiliary power unit, except that it may be configured to only produce electricity and not to provide compressed air to the aircraft or other engines.

Figure 6:
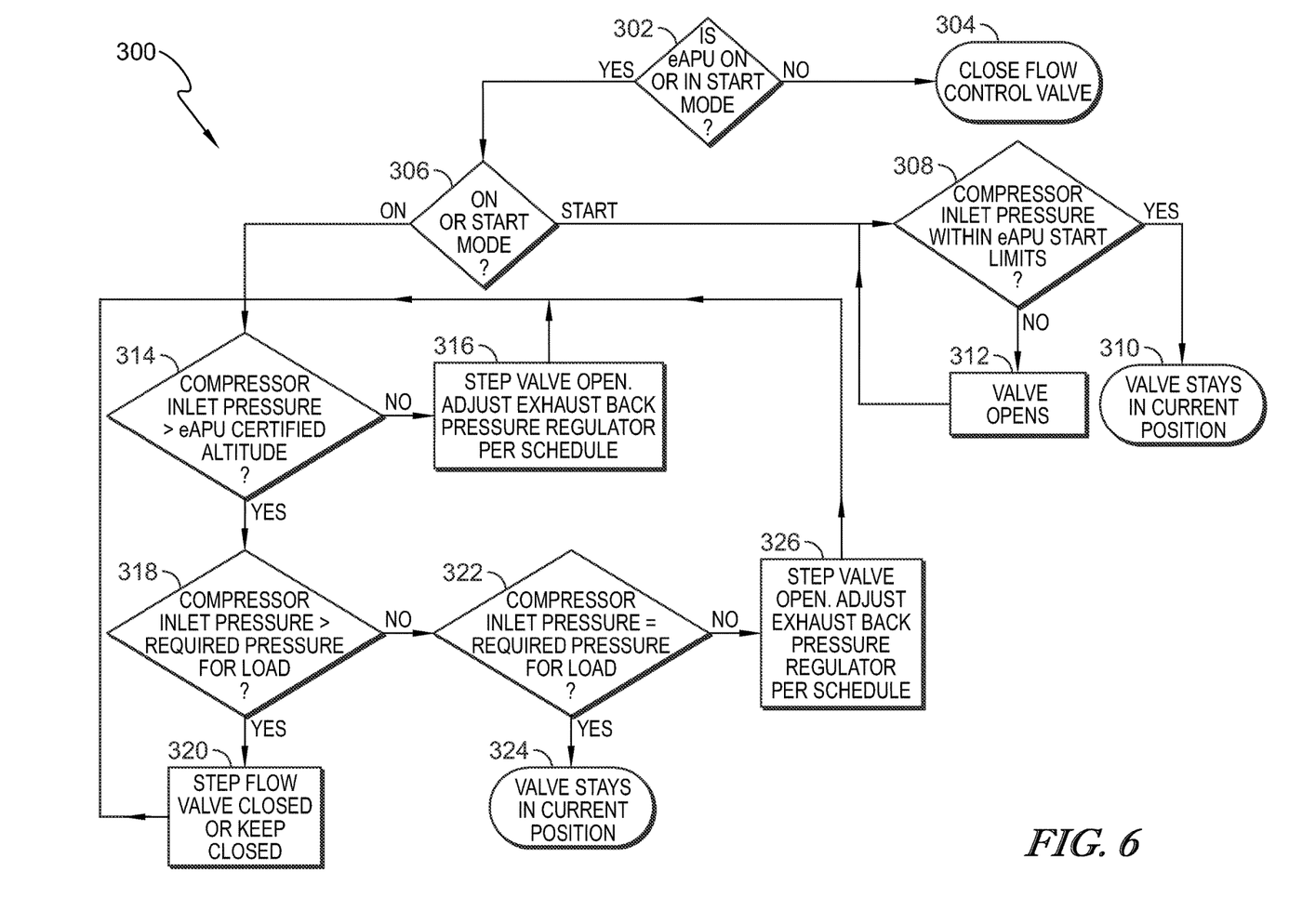
FIG. 6 is a flow chart showing an embodiment of the logic that a controller of the system of FIG. 2 uses to adjust the flow of compressed bleed air from the first gas turbine engine to the air flow mixer of the second gas turbine engine to help the second engine operate at higher altitudes.

FIG. 6 is representative of one embodiment of the logic 300 that is stored in the memory 71. The controller 70 may perform the logic 300 via the processor 73 to maintain the desired inlet pressure at pressure sensor 52 for the compressor 32.

In a step 302, the controller 70 checks the state of the second gas turbine engine 14 to determine if the second gas turbine engine 14 is either on (operating) or in start mode. The controller 70 may make this determination by querying the engine's controller or receive signals from speed/pressure sensors. If the second gas turbine engine 14 is either not on or in the start mode, the controller 70 directs the flow control valve 64 to close as in a step 304. If the controller 70 determines that the second gas turbine engine 14 is either on or in start mode, the controller will move to a step 306. In step 306 shown in FIG. 6, the controller 70 determines if the second gas turbine engine 14 is on (operating) or in start mode (as opposed to neither being true in step 304). If the second gas turbine engine 14 is in start mode, the controller 70 moves to a step 308. If the second gas turbine engine 14 is currently operating, the controller 70 moves to a step 314.

In step 308 shown in FIG. 6, the controller 70 checks the pressure of air at pressure sensor 52 at an inlet of the compressor 32 to determine if it is within the start limits of the second gas turbine engine 14, which are found in a lookup table stored in memory 71. If the pressure at the pressure sensor 52 is within the start limits of the second gas turbine engine 14, the controller 70 keeps the flow control valve 64 in its current position as in a step 310. If the pressure at the pressure sensor 52 is lower than the start limits of the second gas turbine engine 14, the controller 70 will direct the flow control valve 64 to open a predetermined amount as in a step 312, and then will return to step 308.

In step 314 shown in FIG. 6, the controller 70 checks the pressure of air at pressure sensor 52 at an inlet of the compressor 32 to determine if it is greater than the reference pressure corresponding to the certified altitude of the second gas turbine engine 14, which is found in a lookup table stored in memory 71. If the pressure at pressure sensor 52 is less than the certified altitude of the second gas turbine engine 14, the controller 70 will direct the flow control valve 64 to open a predetermined amount and direct the back pressure regulator 68 to adjust per the pressure schedule stored in the memory 71 in order to maintain the desired pressure ratio across the second gas turbine engine 14 as in a step 316, and then return to step 314. If the pressure at pressure sensor 52 is greater than the certified altitude of the second gas turbine engine 14, the controller 70 will move to a step 318.

In step 318 shown in FIG. 6, the controller 70 checks the pressure of air at pressure sensor 52 at an inlet of the compressor 32 to determine if it is greater than the reference pressure required to accommodate the load on the electric generator 40, which is found in a lookup table stored in memory 71. If the pressure at pressure sensor 52 is greater than the pressure required to accommodate the load on the electric generator 40, the controller 70 will direct the flow control valve 64 to close a predetermined amount as in a step 320, and then return to step 314. If the pressure at pressure sensor 52 is less than the pressure required to accommodate the load on the electric generator 40, the controller 70 will move to a step 322.

In step 322 shown in FIG. 6, the controller 70 checks the pressure of air at pressure sensor 52 at an inlet of the compressor 32 to determine if it is equal to the reference pressure required to accommodate the load on the electric generator 40, which is found in a lookup table stored in memory 71. If the pressure at pressure sensor 52 is equal to the pressure required to accommodate the load on the electric generator 40, the controller 70 will direct the flow control valve 64 to stay in its current position as in a step 324. If the pressure at pressure sensor 52 is not equal to the pressure required to accommodate the load on the electric generator 40, the controller 70 will direct the flow control valve 64 to open a predetermined amount and direct the back pressure regulator 68 to adjust per the pressure schedule stored in the memory 71 in order to maintain the desired pressure ratio across the second gas turbine engine 14 as in a step 326, and then return to step 314.

Modern aircraft are becoming increasingly more electric, with electrically driven compressors, electric in-flight entertainment and electro-mechanical actuators instead of hydraulic actuators. These loads may exceed the power generation capability of generators mounted to the primary propulsion engines of the aircraft. Therefore, there may be a desire to generate additional electricity from auxiliary power units, which when only generating electrical power may be called an e-APU. Auxiliary power units are typically much smaller gas turbines used for main engine starting and some supplemental power generation while the main propulsion engines are off. An electric APU or e-APU would only supply electricity rather than bleed air.

To reduce cost, it may be desirable to utilize existing, certified gas turbine engines for this purpose. This creates a challenge in that the most suitable gas turbines from a size perspective are typically helicopter engines or general aviation engines that are not certified for or capable of operating at the high altitudes of modern commercial airliners. In addition, these engines may experience severe lapse rates in their power output capability as the altitude increases, limiting the amount of electric power than can be supplied.

A proposed solution to this challenge in accordance with the present disclosure may be to combine ambient high altitude, low pressure and low temperature air with some compressor bleed air from the main propulsion engines to feed the inlet stream of the e-APU engine. A gas jet ejector may be proposed for mixing the low- and high-pressure streams to create a medium-pressure stream acceptable to the e-APU gas turbine engine. Other methods may also be possible to combine the streams such as a rapid open-close check valve on the compressed bleed air stream An advantage of this arrangement is that lower altitude conditions can be simulated at the inlet of the e-APU. Using compressor bleed air from the main propulsion engine can reduce the operating line increasing surge margin for the main engine depending at the offtake location, whereas the more conventional means of extracting shaft power directly has the effect of decreasing surge margin for the main engine. In the case of a 3-spool engine with an intermediate-pressure (IP) compressor exit bleed, this may increase surge margin on the IP compressor but decrease surge margin on the high-pressure (HP) compressor. By varying the mix ratio of compressor bleed air and ambient air to the e-APU it may enable the e-APU to operate with no compressor bleed air up to its maximum envelope and then as altitude is increased additional compressor bleed air can be fed to the e-APU.

Optionally, since the e-APU's power output may decrease as the altitude is increased, compressor bleed air can be selectively added even while within the e-APU's nominal operating altitude to increase the power capability. A notional planned control algorithm for the e-APU could be as shown in the flowchart of FIG. 6.

Aircraft main engines are typically designed to provide more high-pressure bleed air than the aircraft needs to account for failure scenarios. The present disclosure uses the excess bleed air from main propulsion engines to drive an ejector that feeds the inlet of a second gas turbine engine used for power generation. At lower altitudes no bleed air is taken, and then the scheduled bleed air increases with altitude. Hot bleed air is mixed with cold ambient air to provide an acceptable inlet temperature for the power-producing gas turbine engine. The power-producing gas turbine engine is able to remain within its certified operational envelope using the higher pressure air produced by the ejector. The present disclosure also includes an engine exhaust backpressure regulator to keep exhaust conditions acceptable for engine operation.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine system comprising
a first engine that includes a first compressor, a first combustor, and a first turbine,
a second engine that includes a second engine core and an air flow mixer, the second engine core including a second compressor, a second combustor, and a second turbine, the air flow mixer configured to receive a flow of ambient air and combine the flow of ambient air with compressed air to form a combined air flow, and further configured to direct the combined air flow into the second engine core,
a bleed air control system configured to control an inlet pressure of the second compressor, the bleed air control system including a conduit, a flow control valve, and a controller, the conduit configured to direct the compressed air from the first compressor downstream toward the air flow mixer, the flow control valve fluidly connected with the conduit, the flow control valve configured to selectively vary the flow of compressed air through the conduit, and the controller programmed to adjust the flow control valve in response to the inlet pressure of the second compressor being less than a predetermined value so that a pressure of the combined flow that is directed into the second engine core allows the second engine core to be operable in a low ambient pressure environment, and
a pod configured to couple with an aircraft, the pod including an ambient air inlet, a compressed air inlet, and an exhaust duct, the second engine is located within the pod, the ambient air inlet being fluidically connected to the air flow mixer and configured to receive ambient air from outside of the pod and direct the ambient air to the air flow mixer, the compressed air inlet fluidically connected to the air flow mixer and the conduit and configured to direct the compressed air from the conduit to the air flow mixer, and the exhaust duct fluidically connected to an exhaust of the second engine and configured to direct exhaust gas from the second engine outside of the pod,
wherein the air flow mixer is a gas jet ejector, the gas jet ejector configured to use the compressed air from the first compressor as a motive fluid to urge the ambient air into the gas jet ejector and create the combined flow directed into the second engine core, wherein the gas jet ejector includes a nozzle, the ambient air inlet is arranged circumferentially around the nozzle, the nozzle receives the flow of compressed air, and the ambient air inlet receives the ambient air,
wherein the second engine includes a back pressure regulator downstream of the second engine core, the back pressure regulator configured to vary a pressure of the exhaust of the second engine,
wherein the controller is programmed to vary the flow control valve and the back pressure regulator based on a difference between the pressure at an inlet of the second compressor and a reference pressure value on a predetermined pressure schedule of the second gas turbine engine.

2. The gas turbine engine system of claim 1, wherein the bleed control system further includes a heat exchanger fluidly connected with the conduit, the heat exchanger configured to remove heat from the compressed air.

3. The gas turbine engine system of claim 2, wherein the heat exchanger is configured to receive a second ambient air for removing the heat from the compressed air.

4. The gas turbine engine system of claim 2 wherein the first engine further includes a fan, and the heat exchanger is configured to receive air from the fan for removing the heat from the compressed air.

5. The gas turbine engine system of claim 1, wherein the first compressor further comprises
an intermediate-pressure compressor section having a first port fluidly connected to the conduit,
a high-pressure compressor section having a second port fluidly connected to the conduit,
and wherein the controller is programmed to selectively open one of the first port and the second port based on a predetermined pressure versus flow ratio of the first compressor stored on the controller.

6. The gas turbine engine system of claim 1, wherein the second engine further includes a gearbox and an electrical generator coupled to the gearbox and located within the pod, the electrical generator configured to produce electricity for auxiliary use in the aircraft.

7. The gas turbine engine system of claim 6, wherein the electrical generator is electrically coupled to at least one battery and is located within the pod, the at least one battery configured to store electrical power created by the electrical generator.

8. The gas turbine engine system of claim 1, wherein the pod includes a body portion arranged around the second engine, a nose portion extending axially away from the body portion and tapering to a tip at the distal end of the nose portion, and the ambient air inlet located at the tip of the nose portion.

9. The gas turbine engine system of claim 8, wherein the ambient air inlet extends within the pod directly between the air mixer and the tip of the nose portion, the ambient air inlet configured to allow room within the pod for at least one of an electrical generator, a battery, an electric circuitry, or cooling fluids.

* * * * *